United States Patent
Smith et al.

(10) Patent No.: US 12,554,452 B1
(45) Date of Patent: Feb. 17, 2026

(54) CURSOR MOVEMENT ACROSS MULTIPLE DISPLAYS

(71) Applicant: Lenovo (United States) Inc., Morrisville, NC (US)

(72) Inventors: Christopher Smith, Franklinton, NC (US); Rod D. Waltermann, Rougemont, NC (US); Wenyu Du, Beijing (CN); Jung Hwan Hong, Cary, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 18/902,755

(22) Filed: Sep. 30, 2024

(51) Int. Cl.
*G06F 3/048* (2013.01)
*G06F 3/14* (2006.01)

(52) U.S. Cl.
CPC .................. *G06F 3/1446* (2013.01)

(58) Field of Classification Search
None
See application file for complete search history.

(56) References Cited

U.S. PATENT DOCUMENTS

2013/0337747 A1* 12/2013 Lee ................. G06F 3/0383
455/41.2
2020/0233504 A1* 7/2020 Jacobs ............. G06F 3/03543

\* cited by examiner

*Primary Examiner* — Carl Adams
(74) *Attorney, Agent, or Firm* — FERENCE & ASSOCIATES LLC

(57) ABSTRACT

One embodiment provides a method, including: identifying, utilizing a cursor movement system, an attribute of an information handling device and at least one secondary device paired with the information handling device; identifying, using the cursor movement system, an overlap of a display of the information handling device and a display of the at least one secondary device; and modifying, utilizing the cursor movement system, cursor movement between the display of the information handling device and the display of the at least one secondary device. Other aspects are claimed and described.

20 Claims, 6 Drawing Sheets

CURSOR MOVEMENT ACROSS MULTIPLE DISPLAYS

BACKGROUND

Many users utilize multiple displays when utilizing devices. For example, users may utilize a single device with multiple displays, multiples devices each having a dedicated display, a combination thereof, and/or the like. The use of multiple displays allows a user to view more information at a single time instead of having to reduce windows, open other windows, and/or the like. The ability to view more information at a single time is particularly useful when a user is working on a task or project that includes information in multiple instances of a single application, information in multiple applications, and/or the like. With the multi-display setup, the user can have more of the information visible at a single time than with traditional single display systems. Additionally, technology allows the user to set the multiple displays so that they will communicate with each other so that information can be shared across the displays, information can span across the displays, and/or the like.

BRIEF SUMMARY

In summary, one aspect provides a method, including: identifying, utilizing a cursor movement system, an attribute of an information handling device and at least one secondary device paired with the information handling device; identifying, using the cursor movement system, an overlap of a display of the information handling device and a display of the at least one secondary device; and modifying, utilizing the cursor movement system, cursor movement between the display of the information handling device and the display of the at least one secondary device.

Another aspect provides a system, the system including: a processor; a memory device that stores instructions that, when executed by the processor, causes the system to: identify, utilizing a cursor movement system, an attribute of an information handling device and at least one secondary device paired with the information handling device; identify, using the cursor movement system, an overlap of a display of the information handling device and a display of the at least one secondary device; and modify, utilizing the cursor movement system, cursor movement between the display of the information handling device and the display of the at least one secondary device.

A further aspect provides a product, the product including: a computer-readable storage device that stores executable code that, when executed by a processor, causes the product to: identify, utilizing a cursor movement system, an attribute of an information handling device and at least one secondary device paired with the information handling device; identify, using the cursor movement system, an overlap of a display of the information handling device and a display of the at least one secondary device; and modify, utilizing the cursor movement system, cursor movement between the display of the information handling device and the display of the at least one secondary device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
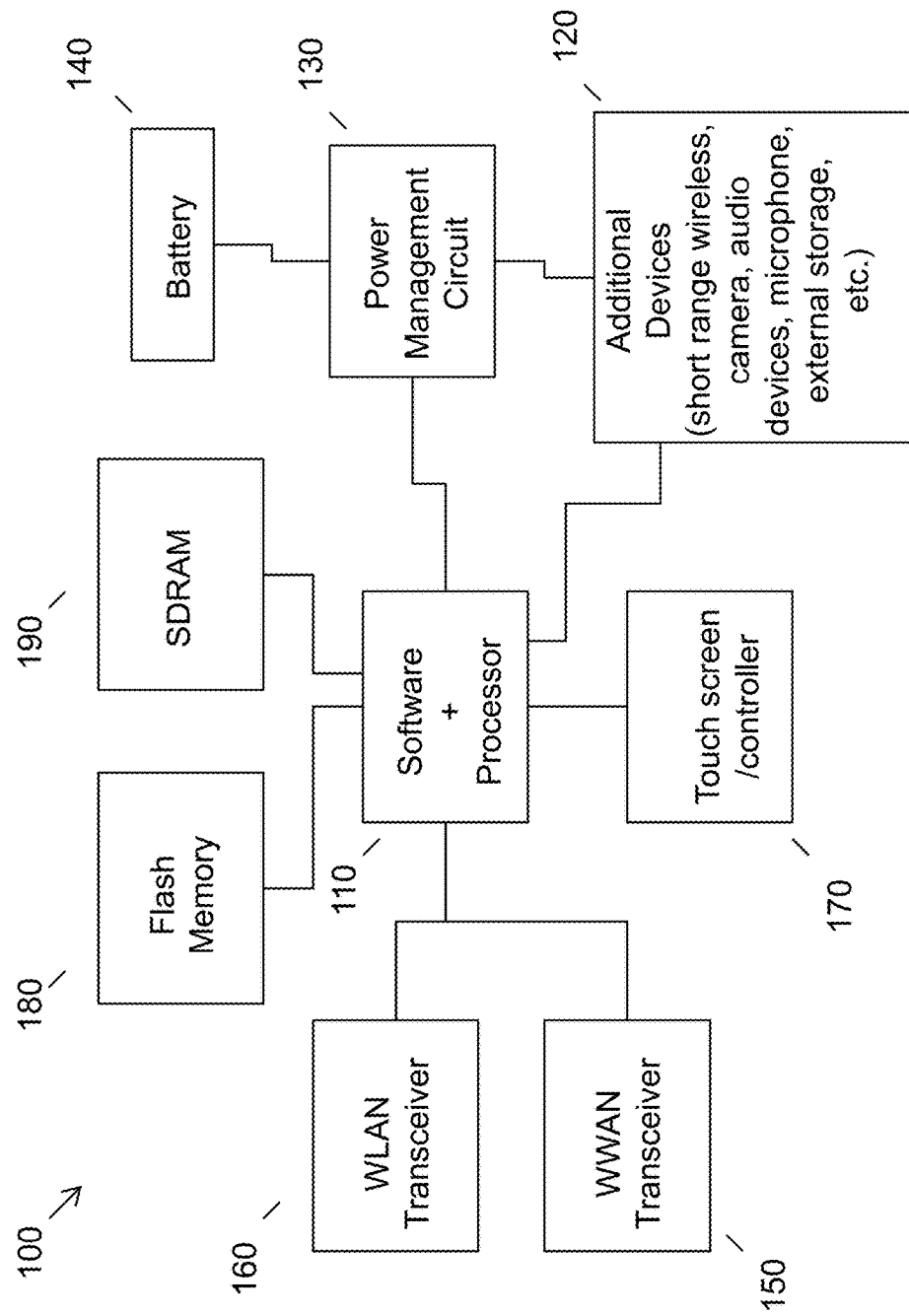
FIG. 1 illustrates an example of information handling device circuitry.

Connection of devices and/or displays to an information handling device permits a user to display more information at a time. Presenting more information at an instance will allow a user to reference, view, and/or alter information without the need to minimize and/or close information on a display that is deemed unnecessary. Rather, a user will just transition focus. Since an information handling device is traditionally provided with a single display, to get a multi-monitor setup, a user is required to connect additional devices or displays. In connecting an additional device, a user will conventionally utilize a wired connection between an information handling device and/or display. A wired connection may allow for transferring of display data between the devices, which commonly results in inconsistencies across the displays. For example, when moving a cursor from one display to another, there may be a jump and/or misalignment of display positions between the displays, particularly if the displays have disparate characteristics (e.g., size, resolution, etc.). Conventionally, a user will have to manually adjust display preferences within a system to correct these inconsistencies.

As technology has advanced and wireless connections between devices has become more prevalent, the inconsistencies between a connection of devices and/or displays remains. A wireless connection between devices that are expanding a display of an information handling device will still face alignment issues, lagging, resolution issues, and/or the like. These inconsistencies are addressed in the same way as the wired connection, requiring a user to enter a settings menu of an information handling device and attempting to manually adjust display characteristics in an attempt to achieve a smooth transition between displays. Unfortunately, a common response to the presence of such inconsistencies results in a user simply dealing with the inconsistencies, which can grow frustrating with continued use. Therefore, what is needed is a system and method that may automatically ensure consistency across multiple devices as they are connected.

While conventional systems allow a user to set the displays in a multiple display setup to act in a certain way with respect to each other, the cursor movement when moving from one display to another is not fluid nor consistent. Thus, a user does not have control over the cursor behavior between two or more displays. This particularly occurs when the displays in the multiple display setup are of different size and/or have different pixel densities.

It is known to have operating systems for information handling devices permit a cursor to move back and forth between two different size displays on any part of the edge of a screen, which results in visual jumping up and down of the cursor. It is also known to have operating systems for information handling devices permit a cursor to move 1 to 1 across two different size displays so there is no jumping, but this creates dead zones when the displays do not line up. In an attempt to address these issues, the WINDOWS 11 operating system from Microsoft Corporation of Seattle, Washington, USA, has a setting entitled "Ease cursor movement between displays" (found in Display Settings) which eliminates dead zones and makes the jumping between two different sized displays less drastic as the cursor approaches the center of the displays. This feature, however, does not allow a cursor to move directly back and forth between the two displays in a line.

As noted above, in order to even provide instructions on how the displays are to act with respect to each other, including cursor movement, the user has to access a display settings menu, which is frequently included in a settings menu. Thus, the user has to access the settings menu, select the displays settings menu, identify the appropriate settings, and provide the desired input for getting the monitors to act correctly. Additionally, since these steps may not be performed all the time, a user may forget where the correct settings menu is located. Thus, the user spends time trying to locate the correct menu to set the multiple displays. Additionally, the user may end up having to provide input to a search feature in order to find the correct menu, which is even more input and time required by the user to set up the displays as the user wants.

Accordingly, the described system provides a method for controlling cursor movement between an information handling device and at least one secondary device by user of a cursor movement system, particularly when the attributes of the devices are not the same. A cursor movement system may identify attributes of an information handling device and at least one secondary device paired with the information handling device. A secondary device may be any device that contains a display, for example, a standalone monitor, a television, a tablet, and/or the like. Additionally, the secondary device and the information handling device may be paired while the system identifies the attributes of the devices. A user may also provide the attributes of the devices. An initial orientation of the paired devices may identify a relationship between an information handling device and at least one secondary device, for example, an initial orientation may determine that relative to a display of an information handling device the top edge of a secondary device co-located with the top edge of the display of the information handling device. An initial orientation may be utilized to establish an initial alignment between an information handling device and at least one secondary device.

A cursor movement system may identify a change in the initial orientation to a second orientation. For example, a user may elect to adjust an orientation of at least one of the devices that are paired together. Upon this identification of transitioning from an initial orientation to a second orientation, a device alignment system may monitor characteristics of a device to determine a second orientation. Then, when it is determined that a change in orientation of at least one device is identified, a cursor movement system may adjust an alignment position between the information handling device and a secondary device. Adjusting an alignment between the devices may include modifying cursor movement between a display of the information handling device and a display of the at least one secondary device. Such a system and method provides an improvement over traditional multiple display system alignment methods by use of a cursor movement system. The cursor movement system may utilize one or more characteristics associated with a display of a device to determine an accurate alignment of displays subsequent to a change in orientation of at least one of an information handling device and at least one secondary device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks 155 (e.g., telecommunications networks, wireless Internet devices (e.g., access points), cloud networks, remote networks, local networks, etc.). Additionally, devices 120 are commonly included, e.g., a wireless communication device, external storage, camera, microphone, external storage, etc. System 100 often includes a touch screen 170 for data input and display/rendering. System 100 also typically includes various memory devices, for example flash memory 180 and synchronous dynamic random-access memory (SDRAM) 190.

Figure 2:
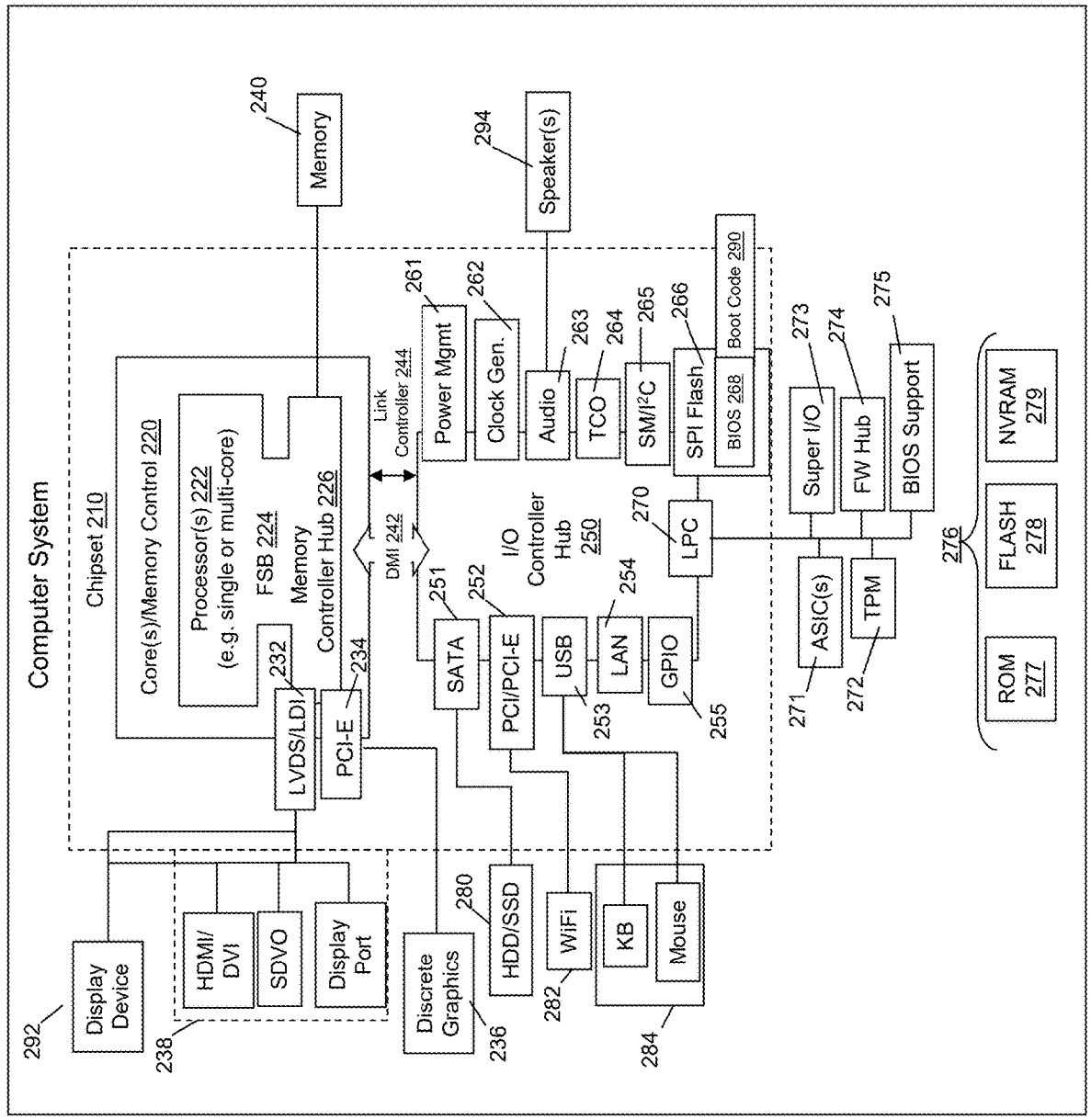
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may include devices that may be pair with each other. For example, the circuitry outlined in FIG. 1 may be implemented in a tablet or smart phone embodiment, whereas the circuitry outlined in FIG. 2 may be implemented in a personal computer embodiment.

Figure 3:
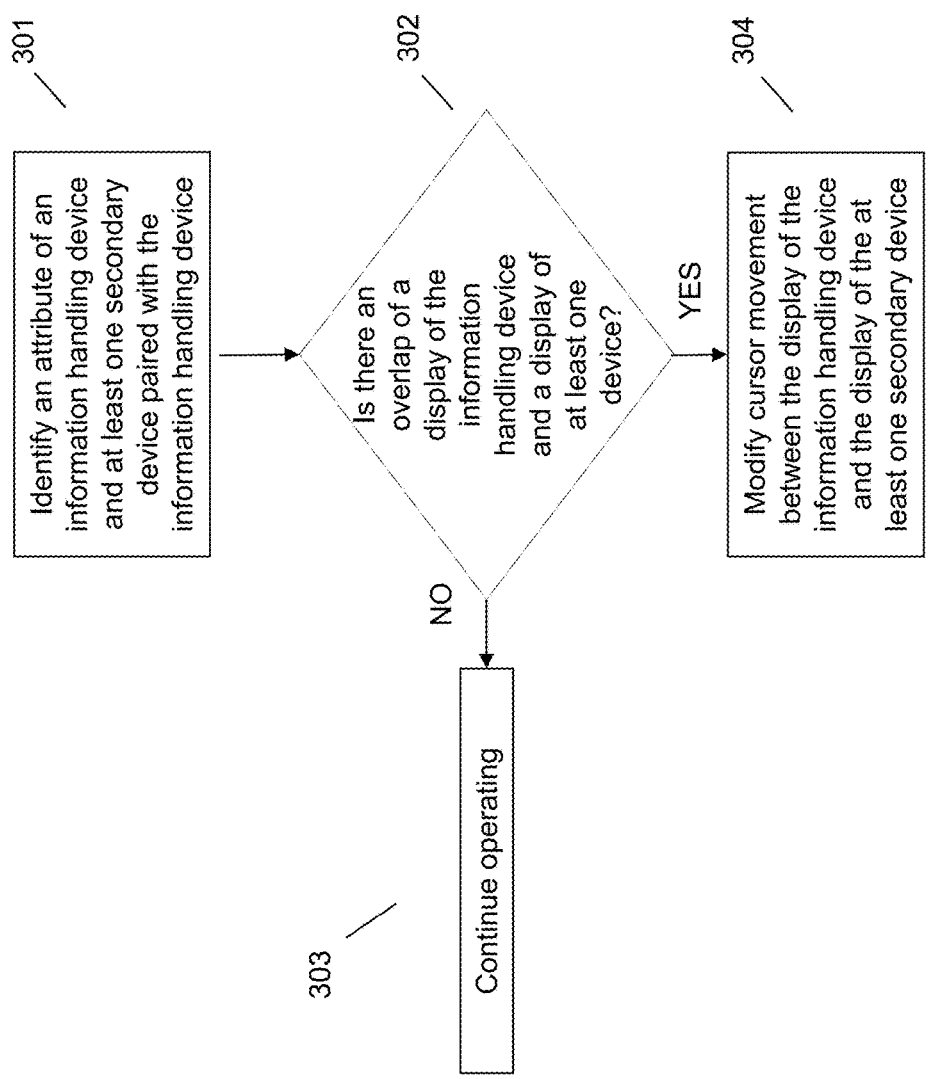
FIG. 3 illustrates an example method for controlling cursor movement across multiple displays.

FIG. 3 illustrates an example method for pairing an information handling device and at least one additional device by use of a cursor movement system. The method may be implemented on a system which includes a processor, memory device, output devices (e.g., display device, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to control cursor movement across multiple displays. Additionally, the cursor movement system includes modules and features that are unique to the described system.

The cursor movement system may be activated when the device is activated. Additionally, or alternatively, the system may be activated when a cursor movement application, a display settings application, and/or the like, is activated, detected, or otherwise opened. The system may also be activated upon detecting that an additional display is detected. For example, the cursor movement system may be activated in order to train one or more artificial intelligence models corresponding to the cursor movement system, identifying initial parameters of an information handling device and/or at least one secondary device, identifying a change in a device position, and/or the like. Thus, the cursor movement system may be activated either manually or automatically when the cursor movement system is needed.

The cursor movement system may be a standalone system, may be accessible through other computing devices, and/or a combination thereof. For example, the cursor movement system may be a standalone system accessed by a user and/or may be provided as an application that is accessible by a user on a computing device. The cursor movement system may be accessible using any type of computing device, for example, a personal computer, laptop computer, smartphone, tablet, smartwatch, smart television, smart appliance, augmented reality device, virtual reality device, display, and/or the like. The cursor movement system may be accessible locally using a computing device where the cursor movement system is installed and/or may be accessible remotely through another computing device. However, the cursor movement system may be located and operated on an information handling device to perform the described steps.

The cursor movement system may be accessed by a user using a device that communicates with the cursor movement system to receive queries from a user, receive query refinements from a user, provide responses to queries to the user, access user profiles, and/or the like. However, the cursor movement system may be located and operate on a different information handling device as compared to the device being utilized by the user to perform the described steps.

The receipt of and response to queries can be provided as a service to other entities or companies. In other words, the cursor movement system could be stored on a server or network of a company and the system could receive and respond to queries received from users, create a refined query, and transfer the query to another query response system for other companies or entities, with the other companies or entities paying for the creation of refined queries or the transfer of refined queries to another system or other use of the query response refinement and transfer system.

The cursor movement system may have an associated graphical user interface. The graphical user interface may be provided on a display or monitor, which may or may not be associated with the cursor movement system. In other words, the cursor movement system may have a dedicated display or monitor or may be accessible using any display or monitor. In either case, the cursor movement system may provide instructions to generate and display the graphical user interface on the display device being used to access the cursor movement system. The graphical user interface may also be updated and managed based upon instructions provided by the cursor movement system. In other words, the cursor movement system generates and transmits instructions to create and update the graphical user interface.

The graphical user interface may include a plurality of tabs, windows, and/or unique interfaces. The graphical user interface may include graphical user interface icons or elements. Graphical user interface icons or elements may include static non-selectable elements (e.g., headers, footers, logos, global information areas, graphics, etc.), dynamic non-selectable elements (e.g., local information areas applying to a specific element, dynamic graphics, information areas that update based upon the information provided therein, indicators, statistics displays, etc.), static selectable elements (e.g., radio buttons, menu icons, selectable indicators, etc.), dynamic selectable elements (e.g., form field input areas, pull-down menus, pop-up windows, etc.), and/or any other elements that may be found in a graphical user interface.

The graphical user interface may allow a user to provide input identifying information to be used by the cursor movement system. For example, the cursor movement system may utilize a user profile, historical information, query response system profile, and/or the like, to identify how to treat a query that has been received from the user, when a refine query has been created, when content should be transferred, to what query response system content should be transferred, the default query response system, and/or the like. The graphical user interface may allow for creation of or access to these profiles, historical information, and/or the like, by allowing a user to input information regarding user preferences, query response system preferences, and/or the like. As will be discussed in more detail, the use of user provided information is not the only way that the profile and/or historical information can be created. The cursor movement system can then utilize these inputs to create the profile(s), store the historical information, identify display parameters, and/or the like.

A user could also use the graphical user interface to adjust information within the profile(s), historical information, and/or the like. Additionally, or alternatively, the user can input a location of information related to one or more of the profiles, historical information, and/or the like, provide a file corresponding to information related to the information, and/or the like, within the graphical user interface. Input may be provided by the user using any type of input modality, including, but not limited to, mechanical input (e.g., keyboard input, mouse input, etc.), touch input, audible or voice input, gesture input, haptic input, thought input, and/or the like.

The graphical user interface may also provide displays that display information of the profiles, information of query response systems, and/or the like. It should be noted that the information to be used by the cursor movement system and information provided by the cursor movement system can be different for different applications, different computing systems, different users, and/or the like. Thus, the information corresponding to input or output of the cursor movement system are not always the same. However, the cursor movement system may have default or system-wide settings that are the same across different users, systems, applications, and/or the like, until the information is adjusted or otherwise changed.

It should be noted that different users may configure the graphical user interface per their preferences. Thus, the graphical user interface layout and configuration may be different between users. How much a user can configure the layout may be restricted or set by a system administrator and/or the like. Additionally, different users or different user roles may have different levels of access, which may also change how and what information is displayed. Thus, different graphical user interfaces may be displayed by the system.

The cursor movement system may utilize one or more artificial intelligence models in identifying an attribute of an information handling device and at least one secondary device paired with the information handling device; identifying an overlap of a display of the information handling device and a display of the at least one secondary device; modifying cursor movement between the display of the information handling device and the display of the at least one secondary device by use of a cursory movement system, and/or the like. Artificial intelligence models may also be used for steps within a step. For example, a model could be utilized to capture and analyze sensors information to identify an initial position of a paired device and identify a change in the initial position to a second position. As another example, a model could be utilized to identify an alignment position calculation and modify cursor movement between the information handling device and the at least one secondary device by use of the cursor movement system.

For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the cursor movement system or may be a model that is created from scratch. Since the cursor movement system is used in conjunction with adjusting an alignment between displays some models that may be utilized by the system are image analysis models, audio analysis models, other analysis models, entity identification models, similarity identification models, language models, large language models, filtering models, classification models, and/or the like. The model may be trained using one or more training datasets. Additionally, as the model is deployed, it may receive feedback to become more accurate over time. The feedback may be automatically ingested by the model as it is deployed. For example, as the model is used to perform the described method, if a user modifies predictions that were made by the model, provides feedback regarding a prediction, or otherwise provides some indication that the predictions or selections made by the model may be incorrect, the model ingests this feedback to refine the model.

On the other hand, as the model makes predictions in connection with performing the described steps, and no changes are made to the resulting prediction, the model may utilize this as feedback to further refine the model. This may be referred to as reinforcement training where a prediction that was made by the model is reinforced as the correct prediction. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural networks, convolutional neural networks, deep neural networks, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The cursor movement system may include different components for carrying out different functions of the system, including different steps to be performed. These components may be hardware components or software components. Some hardware components may include sensors (e.g., image capture devices, proximity sensors, microphones, accelerometers, orientation sensors, etc.) that can be used to identify an initial position of an information handling device and at least one secondary device paired with the information handling device, identify a change in the initial position to a second position, adjust a cursor movement between the information handling device and the at least one secondary device, and/or the like. Other input devices may be utilized to assist with identifying an initial position of an information handling device and at least one secondary device paired with the information handling device, identifying a change in the initial position to a second position, adjusting a cursor movement between the information handling device and the at least one secondary device and/or the like, for example, mechanical input modalities (e.g., keyboard, mouse, etc.), touch input devices, gesture input devices, electromyography input devices, audio input devices, and/or the like. Other hardware components may be utilized to provide output from the cursor movement system.

One software component may include a user profile which may be unique to a user and may assist in determining how to align the devices. For example, the user profile may identify user preferences regarding pairing of devices, how alignment positions should be adjusted, and/or the like. The user may manually input this data into the profile or the information may be populated by the system as the system learns about the user over time. For example, the system may utilize an artificial intelligence model to learn about the user, make correlations between information received from sensors and other inputs and alignment adjustments of the device, and/or the like. This information can be populated within the user profile for use by the system during subsequent alignment position adjustments. The user profile may also include other information about the user that seems to influence how alignment positions are adjusted, how devices are paired, how much movement triggers an adjustment in alignment, and/or the like.

At 301, a system may identify an initial attribute of an information handling device and at least secondary device paired with the information handling device. A cursor movement system may first identify when an information handling device and at least one secondary device are paired together. Pairing at least two devices together indicates that the system is utilizing the at least two devices in combination. For example, pairing an information handling device including a display with a secondary device including a display may permit a user to expand information originally present on a single display across the now paired displays. Pairing systems to operate in combination with one another is not limited to display preferences. However, as will be discussed herein, the pairing of an information handling device to at least one secondary device will concentrate on display preferences.

After identifying that an information handling device and at least one secondary deice are paired, a cursor movement system associated with the information handling device may identify an initial attribute or characteristic of a display of the information handling device and a display of a secondary device. For ease of readability, the information handling device will refer to the device that is being utilized as the base device. Thus, the information handling device can vary among pairings, vary based upon an environment, and/or the like.

An initial attribute or characteristic of each device may identify how a device is originally physically configured. The cursor movement system may identify one or more attributes or characteristics associated with an information handling device and at least one secondary device. Such attributes or characteristics include, but are not limited to, a presentation-type of a device, display resolution characteristics of a device, a size of a display of a device, and/or the like. For example, an initial characteristic of a display of an information handling device may include a landscape orientation, a 1080p video resolution, and 12"×22" display size. The cursor movement system may collect such characteristics, and potentially more, in determining an initial overlap of a device that is paired to at least one additional device. The system can identify the orientation of the devices using one or more sensors on the devices, using one or more sensors or devices within an environment, using an analysis of input received from a user, and/or the like.

As the cursor movement system determines an initial attribute for an information handling device and at least one secondary device that are paired together, the system may also identify an initial alignment of the displays of each the information handling device and the at least one secondary device. An initial alignment between the display of the information handling device and the at least one secondary device identifies how the devices interact with each other, for example, how the displays are configured with respect to each other. For example, an information handling device and a secondary device may differ in size parameters or resolution, thereby, influencing how a cursor may move between the displays of each device.

When a difference in device orientation, device size, device resolution, and/or the like, is present between paired devices, a cursor movement system may work to minimize movement issues between the displays. In other words, the cursor movement system may utilize display characteristics, including a center-point of each display, to calculate and thereafter determine the smoothest transition between device displays. Minimizing movement issues between displays may promote easy use and transitions between displays present in a system. Thus, the initial alignment identifies offsets and other characteristic related to how information is displayed across the displays, including cursor movement, images across the devices, and/or the like.

When identifying an initial attribute and performing an initial alignment of the display of the information handling device and the display of the at least one secondary device, a cursor movement system may utilize a graphical user interface to identify a pairing between the devices and the initial alignment of the devices. The graphical user interface may include providing a visual indicator along an edge of a device indicating how the devices are paired and aligned. The secondary device may also display the graphical user interface, and may also include a visual indicator present at an edge of a display of the secondary device indicating a pairing and alignment relationship with the information handling device.

For example, upon activation of a graphical user interface at an information handling device, a visual indicator located along the right edge of the display of the information handling device may be provided, and visual indicator located along the left edge of the display of a secondary device may also be provided. The visual indicators may be offset with respect to each other to identify the alignment. The offset may be none and the visual indicators of the information handling device and the other device may be aligned across the displays. Therefore, the graphical user interface may indicate a relationship and alignment between the devices through the edges of the displays containing the visual indicator, for example, identifying how a cursor will move from the display of the information handling device through a right edge of the display through the left edge of the display of the secondary device. A graphical user interface associated with a cursor movement system may permit the adjusting of a location of a visual indicator along an edge of a display of an information handling device and an edge of a secondary device to align the displays of the devices.

Additionally, a graphical user interface associated with a cursor movement system may identify a center point of an edge of a display to further assist with aligning information between a display of an information handling device and a display of a secondary device. Since a cursor movement system may recognize a size characteristic of both a display of the information handling device and a secondary device, a visual indicator may identify a center of an edge comprising the visual indicator to determine where the smoothest movement across a display is present. For example, if a display of an information handling device has an alignment point, or a center point along an edge, that is 6" from the top of the display and a display of a secondary device has an alignment portion that is 2.5" from the top of the display, the device alignment system may establish an offset so that when a cursor is moving across a display to the other display that a location of receipt of the cursor on the other display may be consistent with the movement of the cursor. In other words, rather than a cursor jumping, and/or being inconsistent, with the movement between devices, as is traditionally found display pairing methods, the cursor movement system, based upon the presence of the visual indicator and an alignment point, may permit a smooth transition between displays regardless of the size of the displays that are paired together.

An initial orientation, and therefore, an initial alignment of the display of the information handling device and the display of the at least one secondary device may utilize characteristics of each display to determine an alignment or center point between the displays. Then, a device alignment system may determine, at 302, if there is an overlap of a display of the information handling device and a display of the at least one device that are paired together. Once it is determined that there is no overlap of the at least one of the information handling device and the at least one secondary device, the cursor movement system continues operating based upon the identified initial attribute at 303. However, when it is determined that there is an overlap between at least one of the devices at 302, a cursor movement system may modify the cursor movement at 304.

Identifying a change may include identifying a change in a size characteristic of one of the display of the information handling device and the display of the at least one secondary device. A change in a size characteristic may include identifying a change in resolution of the of the display has transitioned from an initial orientation to a second orientation. In other words, orientation does not just refer to a physical orientation of the device(s), but also refers to characteristics of the display(s) that can change how the displays interact with each other. Resolution of a display may be dependent on parameters of a display, therefore, when a change in the parameters is identified, a change in resolution may be identified. For example, a secondary device that has size parameters of 5"×9" initially may then be rotated about a center-point to then have the size parameters of 9"×5". In other words, the previous height size is now the width size and the previous width size is now the height size.

The resolution, and/or the amount of pixels-per-inch, of a display may also change with the parameter sizes. Alternatively, the resolution may be changed without changing the orientation of the device. Therefore, the alignment point present along a perimeter may need adjusting. Additionally, and/or alternatively, when identifying a change in orientation to a second orientation, the cursor movement system may identify a change in presentation-style from a portrait orientation to a landscape orientation and/or a landscape orientation to a portrait orientation. A transition between orientation styles may be modified about a center-point of the display.

After identifying a change in the initial orientation to a second orientation for at least one of an information handling device and/or at least one of a secondary device, the cursor movement system may adjust an alignment position between the information handling device and the at least one secondary device at 304. Adjusting an alignment position between paired devices may result in a modification of cursor movement between the display of the information handling device and the display of the at least one secondary device. In other words, based upon the identified second orientation of the at least one of the information handling device and the at least one of the secondary device, an alignment adjustment may be performed to ensure that cursor movement, or other data that spans the two or more devices, between displays remains smooth and/or does not include movement inconsistencies, for example, jumping, lagging, glitching, and/or the like. Rather, the adjusting the alignment position may further promote continuous cursor movement between paired devices and their displays.

An identified size of the display of an information handling device and an identified size of the display of the at least one secondary device may influence the adjustment of an alignment position because an alignment position between the identified size of each display of each device that has undergone a change to a second orientation may include altered display characteristics in comparison to the characteristics of each display in the initial orientation. In other words, an alignment position between paired devices changes in response to identifying a change in orientation, thereby, requiring an adjustment of alignment position between the displays of the devices.

An identified size of the display of an information handling device and an identified size of the display of the at least one secondary device may influence the adjustment of an alignment position because an alignment position between the identified size of each display of each device that has undergone a change to a second orientation may include altered display characteristics in comparison to the characteristics of each display in the initial orientation. In other words, an alignment position between paired devices changes in response to identifying a change in orientation, thereby, requiring an adjustment of alignment position between the displays of the devices.

Adjusting the alignment position may include calculating a pixel offset for the cursor movement based upon the second orientation of a device. A pixel offset may be calculated from the size, resolution, and/or other size characteristics of a display of the information handling device and the display of the at least one secondary device. As mentioned previously, a change in orientation of a device may influence a change in characteristics of a display of device, and a calculation of pixel offset may account for the characteristic change of the display to ensure smooth cursor movement between displays of each device.

Additionally, and/or alternatively, adjusting an alignment position may be based upon a relative position between the display of the information handling device and the display of the at least one secondary device. A relative position or distance between displays may identify a location and/or a distance between the display of the information handling device and the display of the at least one secondary device. Based upon a determined distance between the displays, a relative position may account for this distance and further support smooth movement between each display. For example, a relative distance between displays that are touching edges may be very small, therefore, when transferring a cursor across displays, the movement may be viewed as continuous. However, when a relative distance between displays is greater, for example, a distance between a display of an information handling device and television mounted on a wall 5 feet away, using the described system, transferring a cursor between displays may account for the distance present and therefore, the movement of the cursor in a diagonal motion may move past the edge of the display of an information handling device at one location and arrive at a location on the display of a television higher or lower than the point of intersection with the display of the information handling device.

A cursor movement system may perform an adjustment of an alignment position automatically upon identifying a change in an initial orientation to a second orientation. Additionally, and/or alternatively, a device alignment position may provide a notification to a user at a display of an information handling device requesting a change in the alignment position upon recognition of the change from an initial orientation to a second orientation. The cursor movement system may also present, on a display of the information handling device and the display of the at least one secondary device responsive to the adjusting, an indicator indicating the alignment position as been adjusted. An indicator indicating the adjusted alignment position may be a notification identifying the adjustment and/or may be the positioning of a visual indicator at an alignment point provided via the graphical user interface.

An example calculation of alignment position based on display size and resolution of a display of an information handling device and a display of at least one secondary device is described below. This is intended as being a non-limiting example and is used for illustrative purposes.

Subsequent to identifying a display of an information handling device and a display of secondary device are paired, and identifying their associated display characteristics, a device alignment system determines that a rotation of a secondary device has occurred. An initial orientation of the display of the information handling device is 12"×22". An initial orientation of the display of the secondary device is 5"×9", which has since been rotated to a second orientation which now is 9"×5". The device alignment system may calculate an alignment point for the display of the information handling device to be 6" from the top of the display. The device alignment system may also calculate the initial orientation alignment point for the display of the secondary device as 2.5" from the top of the display.

Thereafter, the system calculates the alignment point for the display of the secondary device at the second orientation as 4.5". As can be seen, a change in alignment point for the secondary device has transitioned from 2.5" at the initial orientation to 4.5" at the second orientation. The cursor movement system may now conclude that alignment point present on the display of the information handling device and the alignment point of the display of the secondary device at the second orientation differ by 1.5". Then, with this determined difference between alignment points of the displays, the device alignment system may calculate a pixel offset between the displays from a determined dots-per-inch, and/or pixels-per-inch, ratio present between the displays. The determined difference of 1.5" between the alignment point of the display of the information handling device and the alignment point of the secondary device at a second orientation is smaller than the difference between the alignment point of the display of the information handling device and the alignment point of the secondary device at an initial orientation (3.5"), and therefore, ensures an even smoother transitions between the paired displays.

Figure 4A:
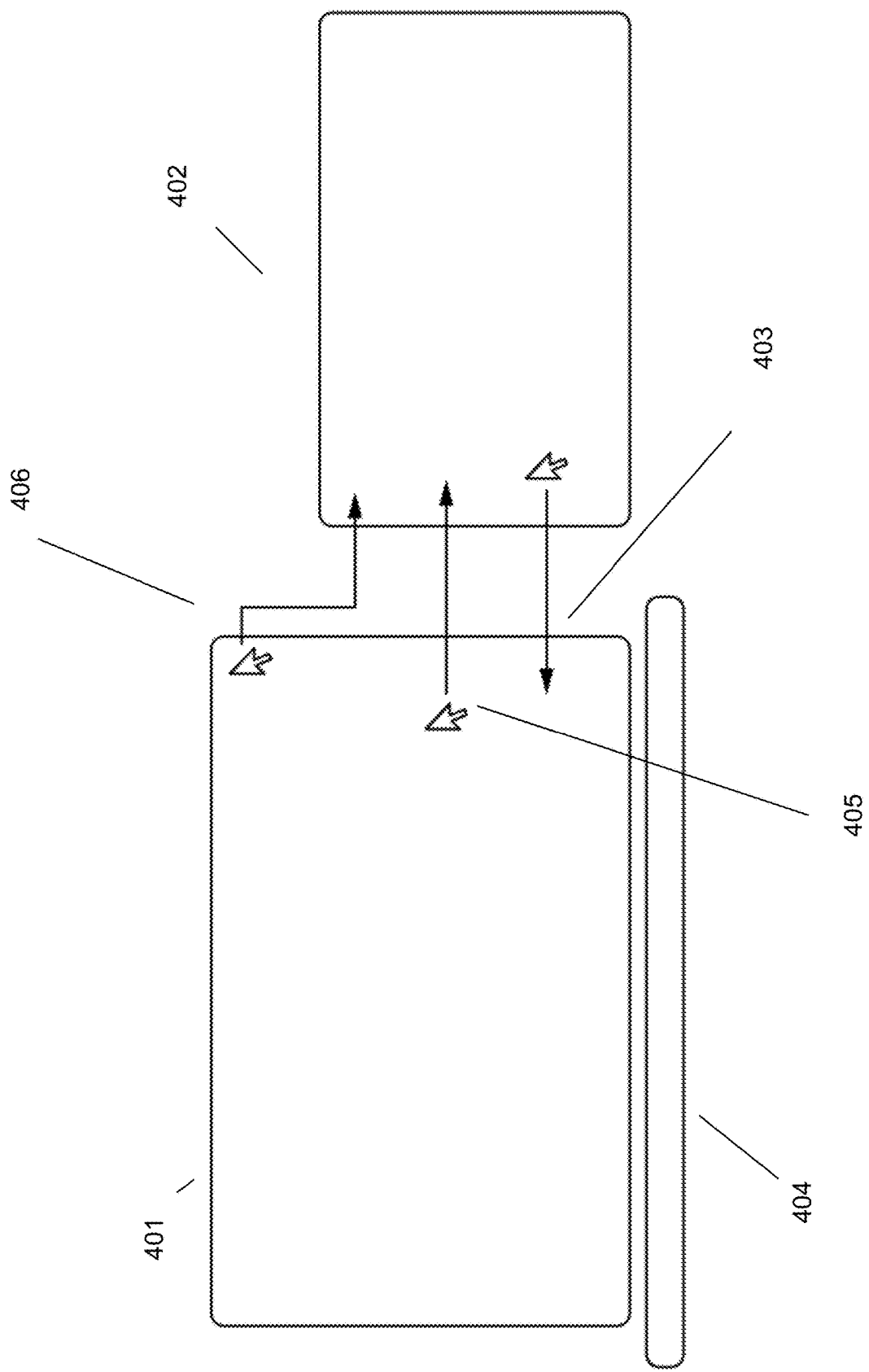
FIGS. 4A and 4B illustrate cursor movement across two displays when the displays are positioned next to one another.

Referring now to FIG. 4A, an example illustration of moving a cursor between a display of an information handling device at an initial orientation and a display of a secondary device at an initial orientation is provided. The figure provides an example view of how cursor movement may be adjusted to provide a smooth transition between displays. A display of the information handling device 401 is provided at an initial orientation. In this example, the information handling device in use is a traditional laptop present in a landscape orientation. As a user interacts with the information handling device 404 and attempts to move a cursor across a display of the information handling device to a display of the secondary device 402 also having an initial landscape orientation. In this example, the secondary device 402 is a tablet computer whose display is smaller than the display of the traditional laptop and the bottom of the display for each device is aligned. This alignment creates an overlap of the two displays for a portion of the display for the traditional laptop. For the area of the displays that overlap, the cursor moves 1 to 1 across the screens so there is no jumping (403, 405). For the areas of the displays that do not overlap, the cursor moves back and forth between two devices on any part of the edge of screen (406).

Figure 4B:
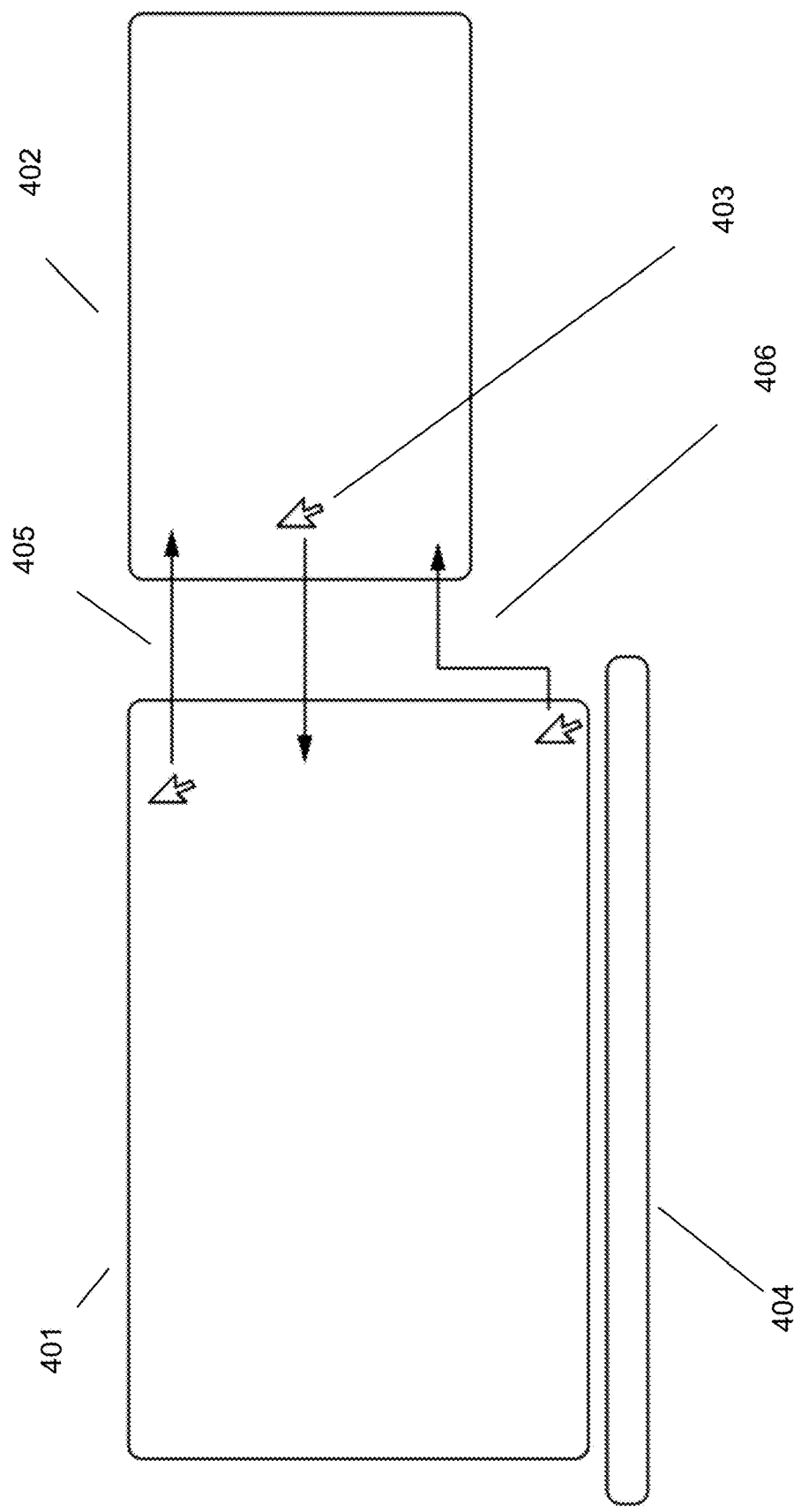

Referring now to FIG. 4B, another example illustration of moving a cursor between a display of an information handling device at an initial orientation and a display of a secondary device at an initial orientation is provided. This figure depicts the same configuration as what is shown in FIG. 4A, with the exception that the top of the display of the information handling device 401 and the top of the display for secondary device 402 are now aligned. In FIG. 4A, however, it is the bottom of both displays that are aligned. The same reference numerals are used in both FIG. 4A and FIG. 4B. Again, the alignment shown in FIG. 4B creates an overlap of the two displays for a portion of the display for the traditional laptop. For the area of the displays that overlap, the cursor moves 1 to 1 across the screens so there is no jumping (403, 405). For the areas of the displays that do not overlap, the cursor moves back and forth between two devices on any part of the edge of screen (406).

Figure 5:
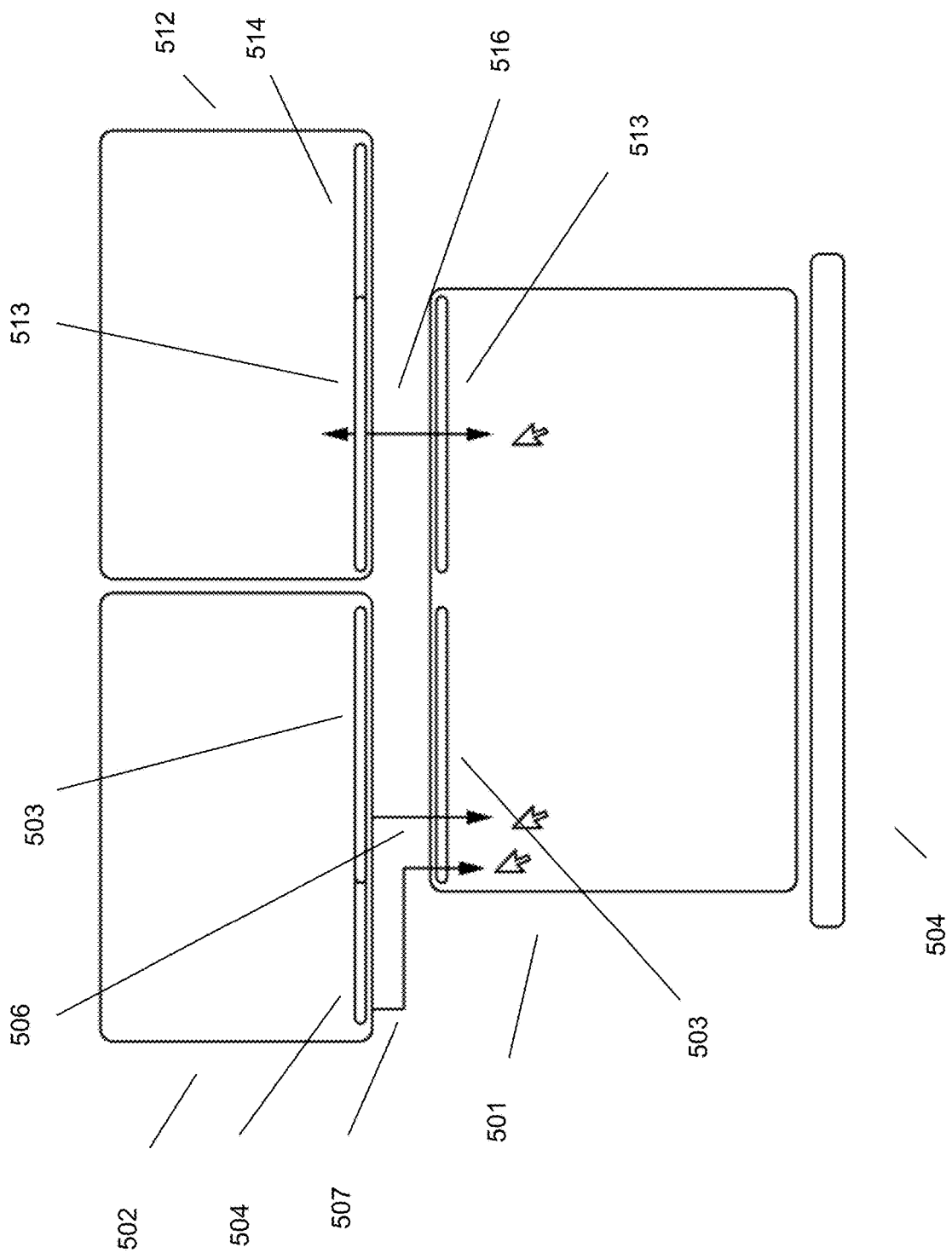
FIG. 5 illustrates cursor movement across three displays when a second and third display are positioned above a first display.

Referring now to FIG. 5, an example illustration of moving a cursor between a display of an information handling device at an initial orientation and a display of multiple secondary devices at an initial orientation is provided. The figure provides an example view of how cursor movement may be adjusted to provide a smooth transition between displays. A display of the information handling device 501 is provided at an initial orientation. In this example, the information handling device in use is a traditional laptop present in a landscape orientation. As a user interacts with the information handling device 504 and attempts to move a cursor across a display of the information handling device to a display of the secondary device 502 also having an initial landscape orientation. In this example, the secondary device 502 is a tablet computer whose display is smaller than the display of the traditional laptop and the bottom of the display for the secondary device 502 is aligned with the top of the laptop display 501. This alignment creates an overlap of the two displays for a portion of the display for the traditional laptop at area 503 (shown on both displays). There is also a portion of the display for the secondary device 504 that does not overlap. For the area of the displays that overlap (503), the cursor moves 1 to 1 across the screens so there is no jumping (506). For the areas of the displays that do not overlap (504), the cursor moves back and forth between two devices on any part of the edge of screen (507).

As a user interacts with the information handling device 504 and attempts to move a cursor across a display of the information handling device to a display of the tertiary device 512 also having an initial landscape orientation. In this example, the tertiary device 512 is a tablet computer whose display is smaller than the display of the traditional laptop and the bottom of the display for the tertiary device 512 is aligned with the top of the laptop display 501. This alignment creates an overlap of the two displays for a portion of the display for the traditional laptop at area 513 (shown on both displays). There is also a portion of the display for the tertiary device 512 that does not overlap. For the area of the displays that overlap (513), the cursor moves 1 to 1 across the screens so there is no jumping (516). For the areas of the displays that do not overlap (514), the cursor moves back and forth between two devices on any part of the edge of screen (not shown) in a manner similar to 507.

The various embodiments present herein provide an improvement over traditional methods for adjusting an alignment position between an information handling device and at least one secondary device. Rather than requiring a user to access system settings and/or make manual changes utilizing traditional methods, the described system and method provides a cursor movement system that may permit easy movement between different displays that are paired. A user may change at least one device paired to at least one secondary device and a cursor movement system, in combination with a graphical user interface, may ensure that cursor movement between displays remain smooth and consistent. This is an improvement over traditional techniques that conventionally result in inconsistencies across displays or require the users to perform many manual steps to align the displays.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. A method, the method comprising:
identifying, utilizing a cursor movement system, an attribute of an information handling device and at least one secondary device paired with the information handling device;
identifying, using the cursor movement system, an overlap of a display of the information handling device and a display of the at least one secondary device, wherein the identifying the overlap comprises identifying an alignment position between the display of the information handling device and the display of the at least one secondary device, wherein the identifying the alignment position comprises identifying a center-point of the display of the information handling device and a center-point of the display of the at least one secondary device paired with the information handling device; and
modifying, utilizing the cursor movement system and in response to identifying an adjustment in the alignment position between the information handling device and the at least one secondary device, cursor movement between the display of the information handling device and the display of the at least one secondary device, wherein the adjustment in the alignment position comprises a change in center-point of a display of at least one of the information handling device and the at least one secondary device paired with the information handling device.

2. The method of claim 1, wherein the identifying an attribute comprises identifying a size of the display of the information handling device.

3. The method of claim 1, wherein the identifying an attribute comprises identifying a pixel density of the display of the information handling device.

4. The method of claim 1, wherein the identifying an attribute comprises identifying a size of the display of the at least one secondary device.

5. The method of claim 1, wherein the identifying an attribute comprises identifying a pixel density of the display of the at least one secondary device.

6. The method of claim 1, wherein the modifying cursor movement comprises performing an initial alignment of the display of the information handling device and the display of the at least one secondary device based upon an initial orientation and an identified size of the display of the information handling device and an identified size of the display of the at least one secondary device.

7. The method of claim 6, wherein the modifying comprises utilizing the identified size of the display of the information handling device and the identified size of the display of the at least one secondary device to identify the alignment position.

8. The method of claim 1, wherein the modifying cursor movement comprises calculating a pixel offset for the cursor movement based upon the overlap.

9. The method of claim 1, wherein the modifying cursor movement is based upon a relative position between the display of the information handling device and the display of the at least one secondary device.

10. The method of claim 1, wherein the modifying cursor movement provides a 1 to 1 cursor movement for the overlap portion of the displays; and
wherein the modifying cursor movement comprises a back and forth between cursor movement on any part of a screen edge where there is no overlap of the displays.

11. A system, the system comprising:
a processor;
a memory device that stores instructions that, when executed by the processor, causes the system to:
identify, utilizing a cursor movement system, an attribute of an information handling device and at least one secondary device paired with the information handling device, wherein to identify the overlap comprises identifying an alignment position between the display of the information handling device and the display of the at least one secondary device, wherein to identify the alignment position comprises identifying a center-point of the display of the information handling device and a center-point of the display of the at least one secondary device paired with the information handling device;
identify, using the cursor movement system, an overlap of a display of the information handling device and a display of the at least one secondary device; and
modify, utilizing the cursor movement system and in response to identifying an adjustment in the alignment position between the information handling device and the at least one secondary device, cursor movement between the display of the information handling device and the display of the at least one secondary device, wherein the adjustment in the alignment position comprises a change in center-point of a display of at least one of the information handling device and the at least one secondary device paired with the information handling device.

12. The system of claim 11, wherein the identifying an attribute comprises identifying a size of the display of the information handling device.

13. The system of claim 11, wherein the identifying an attribute comprises identifying a pixel density of the display of the information handling device.

14. The system of claim 11, wherein the identifying an attribute comprises identifying a size of the display of the at least one secondary device.

15. The system of claim 11, wherein the identifying an attribute comprises identifying a pixel density of the display of the at least one secondary device.

16. The system of claim 11, wherein the modifying cursor movement comprises performing an initial alignment of the display of the information handling device and the display of the at least one secondary device based upon an initial orientation and an identified size of the display of the information handling device and an identified size of the display of the at least one secondary device.

17. The system of claim 16, wherein the modifying comprises utilizing the identified size of the display of the information handling device and the identified size of the display of the at least one secondary device to identify the alignment position.

18. The system of claim 11, wherein the modifying cursor movement comprises calculating a pixel offset for the cursor movement based upon the overlap.

19. The system of claim 11, wherein the modifying cursor movement is based upon a relative position between the display of the information handling device and the display of the at least one secondary device.

20. A product, the product comprising:
   a computer-readable storage device that stores executable code that, when executed by a processor, causes the product to:
   identify, utilizing a cursor movement system, an attribute of an information handling device and at least one secondary device paired with the information handling device;
   identify, using the cursor movement system, an overlap of a display of the information handling device and a display of the at least one secondary device, wherein to identify the overlap comprises identifying an alignment position between the display of the information handling device and the display of the at least one secondary device, wherein to identify the alignment position comprises identifying a center-point of the display of the information handling device and a center-point of the display of the at least one secondary device paired with the information handling device; and
   modify, utilizing the cursor movement system and in response to identifying an adjustment in the alignment position between the information handling device and the at least one secondary device, cursor movement between the display of the information handling device and the display of the at least one secondary device, wherein the adjustment in the alignment position comprises a change in center-point of a display of at least one of the information handling device and the at least one secondary device paired with the information handling device.

* * * * *